Figure 1:
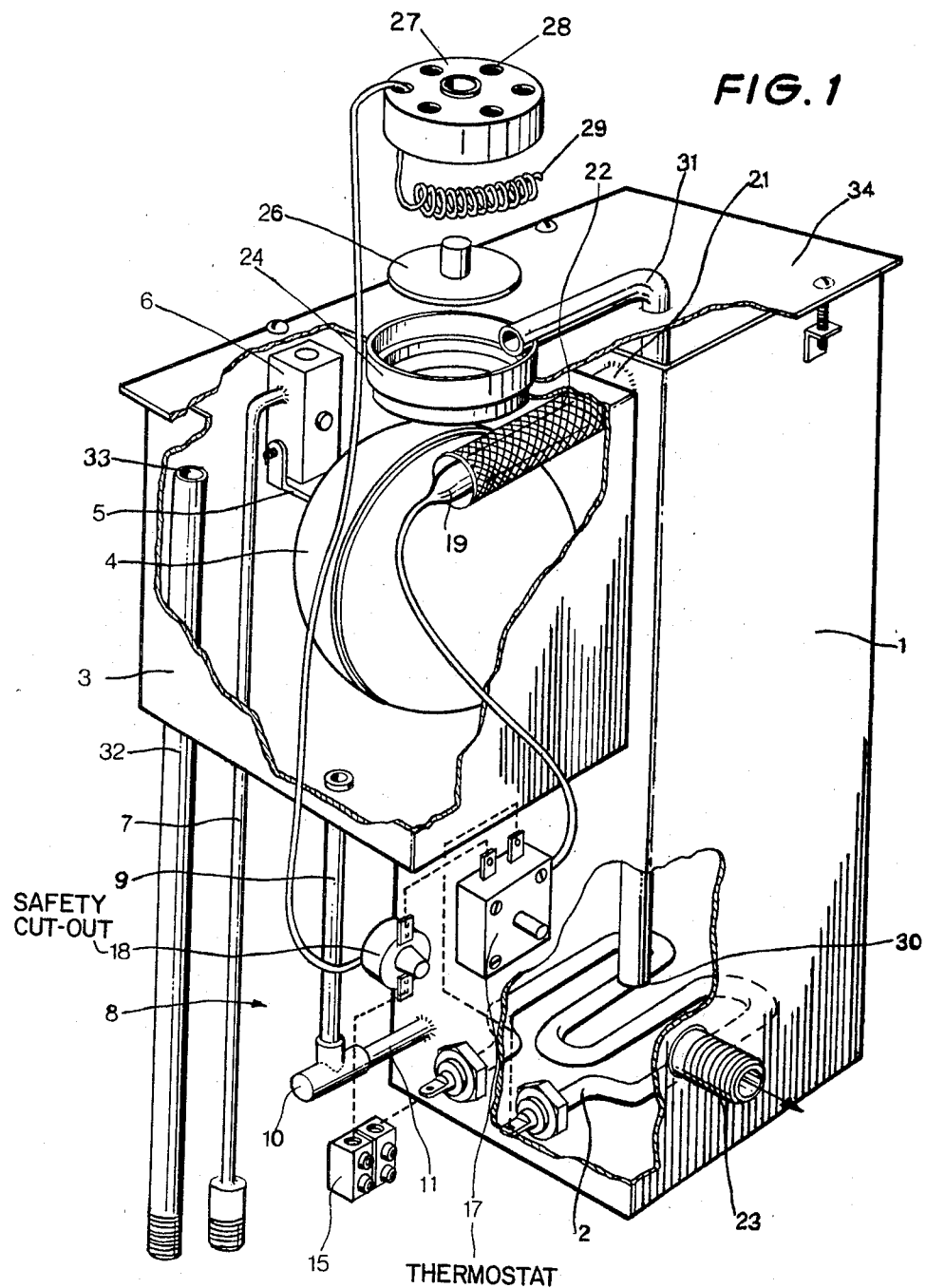

United States Patent [19]

Massey et al.

[11] 4,354,094

[45] Oct. 12, 1982

[54] THERMOSTATICALLY CONTROLLED ELECTRIC CONTINUOUS WATER HEATING UNIT

[75] Inventors: Raymond D. Massey, Cambridge Park; Leonard Newsam, Dulwich Hill, both of Australia

[73] Assignee: Zip Heaters (Aust.) Pty. Limited, New South Wales, Australia

[21] Appl. No.: 206,224

[22] Filed: Nov. 12, 1980

[51] Int. Cl.³ .......................... H05B 1/02; F24H 1/20
[52] U.S. Cl. ................................ 219/306; 122/13 A; 126/351; 137/341; 219/308; 219/314; 219/322; 219/328; 219/333; 222/146 HE
[58] Field of Search ............... 219/296, 297, 308, 309, 219/312, 314, 316, 321–324, 327, 333, 331, 328, 306; 122/13 A; 126/351; 137/341; 222/146 HE

[56] References Cited

U.S. PATENT DOCUMENTS

| | | | |
|---|---|---|---|
| 1,204,779 | 11/1916 | Junkers | 126/351 |
| 1,729,777 | 10/1929 | Hargreaves | 219/314 |
| 2,894,109 | 7/1959 | Kendon | 219/308 X |
| 3,497,673 | 2/1970 | Wright | 219/321 X |

FOREIGN PATENT DOCUMENTS

| | | | |
|---|---|---|---|
| 72286 | 8/1976 | Australia | 219/308 |
| 2356886 | 1/1978 | France | 219/312 |
| 460339 | 1/1937 | United Kingdom | 122/13 A |

*Primary Examiner*—A. Bartis
*Attorney, Agent, or Firm*—Ladas & Parry

[57] ABSTRACT

An automatic continuous boiling water heater unit has a water heating tank incorporating an electric heating element near the bottom thereof and a float operated valve for feeding water to the heating tank from a level control tank mounted alongside the heating tank through a constricted conduit designed to allow a water flow rate substantially equal to the boiling water heating rate capacity of the element. A temperature control device, including a temperature sensitive probe surrounded by a metal gauge and positioned in a conduit communicating the level control tank with the heating tank above the water level therein maintained by the float operated valve, is provided for deenergizing the heating element when the water in the heating tank reaches boiling temperature. A safety cut-off switch responsive to a temperature sensitive capillary located in the path of steam discharged through a steam pressure safety valve at the top of one of the tanks deenergizes the heating element should the temperature control device fail. A safety vent tube having an inlet below the hot water discharge from the heating tank but above the heating element is arranged to direct steam onto the temperature sensitive capillary should the water supply to the heating unit fail.

7 Claims, 2 Drawing Figures

THERMOSTATICALLY CONTROLLED ELECTRIC CONTINUOUS WATER HEATING UNIT

This invention relates to a continuous water heating unit and has been devised particularly though not solely for the continuous supply of boiling hot water in small quantities.

It is desirable to provide a continuous water heating unit which will enable boiling (which term includes near boiling, i.e. 98°–100° C.) hot water to be provided in small quantities on demand without manually refilling the unit. Such a unit is particularly desirable in applications where small quantities of tea or coffee are required to be made such as in the home or in small offices.

It is therefore an object of the present invention to provide a continuous water heating unit which will go at least part of the way towards meeting the foregoing desiderata in a simple yet effective manner or which will at least provide the public with a useful choice.

Accordingly the invention consists in a continuous water heating unit comprising a water heating tank containing an electric heating element near the bottom of said tank, a level control tank mounted alongside the heating tank, said level control tank incorporating a float actuable valve connected to a supply of water and arranged to maintain water in said level control tank within predetermined level limits, a drawoff connection from said heating tank, a controlled flow connection between said level control tank and said water heating tank arranged to allow water to pass from said level control tank to said water heating tank at a controlled rate substantially equal to the boiling water heating rate of said element and a temperature control device adapted to cut the supply of electricity to said element when the water in said water heating tank reaches boiling point and to restore power to said element when the temperature of the water in said water heating tank drops below boiling point.

Figure 2:
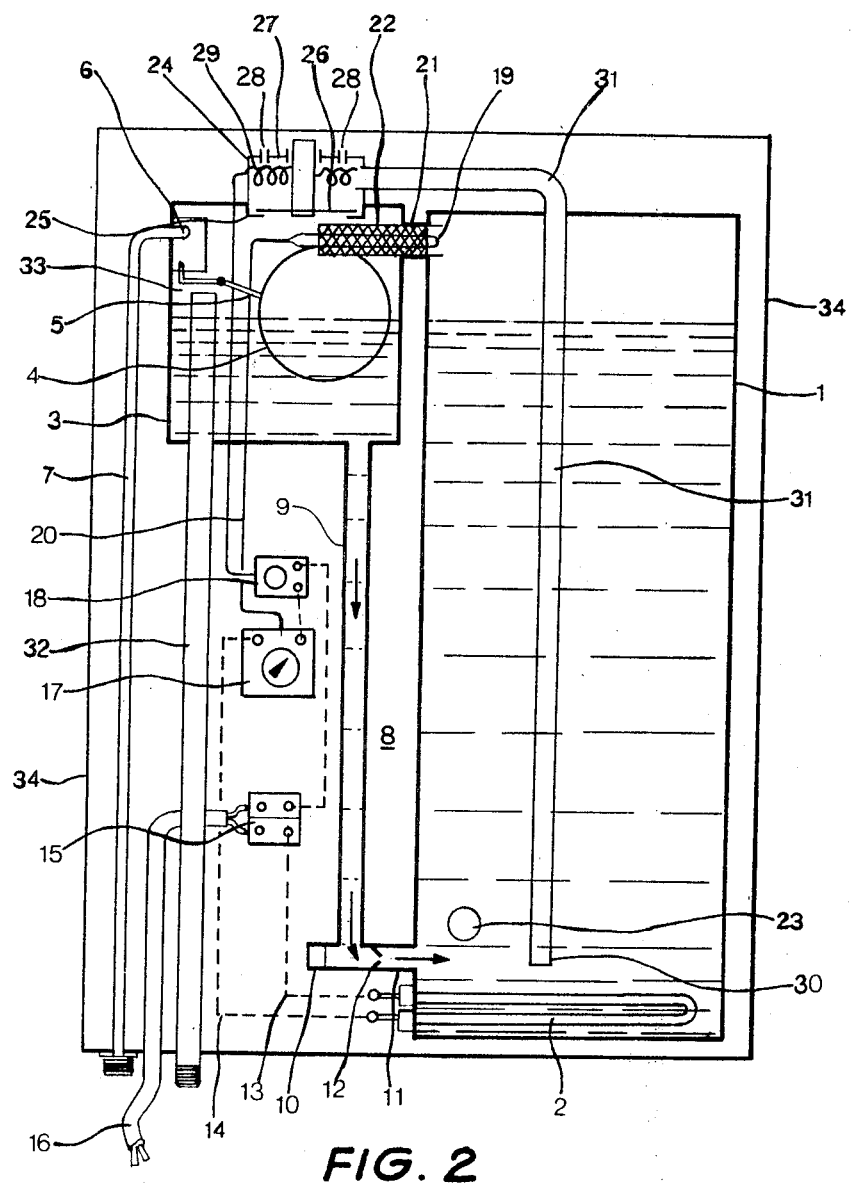

Notwithstanding any other forms that may fall within its scope, one preferred form of the invention will now be described with reference to the accompanying drawings, in which:

FIG. 1 is a cut-away perspective view of a continuous water heating unit according to the invention; and FIG. 2 is a diagrammatic cross-sectional elevation of the water heating unit shown in FIG. 1.

In the preferred form of the invention a continuous water heating unit is constructed as follows:

A water heating tank 1 is provided which may, for example be formed from sheet metal and which contains an electric heating element 2 near the bottom of the tank. In the preferred form of the invention the heating element may, for example be a 1600 watt electric heating element.

A level control tank 3 is provided located immediately alongside the heating tank 1 and containing a level control float 4. The level control float is connected by way of a pivoting arm 5 to an inlet valve 6 which is connected to a supply of cold water through an inlet pipe 7. The valve 6 is arranged to supply water to the level control tank when the float 4 drops below a predetermined level and to cut off the supply of water when the level rises to a predetermined level. The operation of this type of valve is well known in cisterns of many different types.

A controlled flow connection 8 is provided between the level control tank 3 and the water heating tank 1. The controlled flow connection comprises a vertical pipe 9 extending downwardly from the bottom of the level control tank 3 to a T-junction 10 and thence through a horizontal pipe 11 into the water heating tank at a level immediately above the heating element 2. In this manner water passing from the level control tank to the heating tank is directed onto the heating element 2. The controlled flow connection is provided with a restricted orifice 12 having an aperture therein which will allow water to pass from the level control tank 3 under the pressure head controlled by the float valve 6 to the water heating tank at a rate substantially equal to the boiling water heating rate of the element 2. For example, if the element 2 has a heating rate of one fifth of a liter per minute, from the ambient temperature of the level control tank to boiling point, then the controlled flow orifice 12 has an aperture therein which will allow a flow rate from the level control tank to the water heating tank of one fifth of a liter per minute.

The element 2 is provided with electric power through wires 13 and 14. Wire 13 leads directly to a power supply block 15 connected to a power inlet cable 16. Wire 14 leads to the power block 15 through a thermostat 17 and a safety cut-out switch 18. The thermostat 17 is connected to and controlled by a thermostat bulb 19 by way of a capillary tube 20. The thermostat bulb is positioned in a tubular conduit 21 connecting the heating tank and the level control tank above the maximum water level. The thermostat bulb is surrounded by a tube of metal gauze 22 which directs steam from the water heating tank 1 over the thermostat bulb. The use of metal gauze has the particular advantage that it enables a quick reaction of the thermostat bulb to a change in the steam temperature issuing from the water heating tank 1. Because the steam from the tank is directed onto the thermostat bulb by the gauze, the bulb can quickly sense when the steam temperature reaches boiling point, i.e. 100° C., and yet allows quick cooling of the thermostat bulb once the steam temperature drops below boiling point. It has been found that the use of the metal gauze sleeve around the thermostat bulb enables the thermostat to be set to operate within a small temperature range, e.g. between 99.5° C.–100° C. The thermostat is set so that when the steam temperature as sensed by the bulb 19, falls to 99.5° C., then power is supplied to the heating element 2. Once the water is again heated to boiling point and the steam issued reaches 100° C., the thermostat 17 cuts off the power supply to the heating element 2.

It is a feature of the unit that steam passing through the conduit 21 into the level control tank is condensed by the cooler water in the level control tank so preventing any significant escape of steam through the vent tube 32.

A draw-off connection 23 is provided located in the side of the water heating tank above the level of the element 2 so that the tank cannot be emptied to expose the element 2 in use. The outlet connection 23 may conveniently be directly connected to a draw-off tap (not shown).

The water heating unit is provided with a safety device which is described in greater detail in our co-pending Application No. PE6080. The device comprises a canister 24 inset into the top surface of the water level control tank and having a lower end 25 which is normally closed by a weighted disc valve 26. The capsule is provided with a cover 27 having apertures 28 therein to allow steam to escape from the capsule. Should the thermostat 17 fail in the "on" position causing the element 2 to continuously boil water in the water heating tank 1, then steam pressure is built up within the tank and transmitted through the conduit 21 into the level control tank 3. The pressure build up in the tank lifts the disc valve 26 allowing steam to escape into the capsule 24 and out through the vent holes 28. The capsule is provided with a coiled temperature sensitive capillary 29 which is connected to the cut-out switch 18 arranged so that when the coil 29 senses boiling steam, i.e. at 100° C., the cut-out 18 is actuated to cut the supply of power to the heating element 2. The cut-out switch 18 would normally be manually resettable.

The safety device is also provided with a tube 31 communicating with the interior of the canister 24 and extending downwardly into the water heating tank 1 to terminate at a lower end 30 just below the level of the outlet 23.

Should the water supply through inlet pipe 7 fail and the water level in the water heating tank 1 drop to the level of the outlet 23, then the remaining water in the tank will continue to be heated and evaporated until the level drops to the lower end 30 of a pipe 31. Once the water level drops below the lower end 30, then steam issuing from the surface of the water can pass up the pipe 31 and in to the container 24 where it heats the capillary 29 to activate the cut-out switch 18.

The unit is also provided with an overflow and vent pipe 32 extending downwardly to a convenient drain outlet from a point in the level control tank 3 just above the normal maximum water level. Should the water inlet valve 6 fail and water continue to enter the level control tank, then the water will overflow the upper end 33 of the drain pipe 32 and be drained away harmlessly.

The entire apparatus is mounted within a cabinet 34 and a layer of thermal insulation is provided between the cabinet walls and the water heating and level control tanks. It is a feature of the unit that the level control tank is mounted directly adjacent the water heating tank to achieve some transfer of heat from the water heating tank to the level control tank to preheat the water in the level control tank. Because the water is preheated, it may be allowed to flow at a faster rate into the water heating tank and still be instantaneously heated to boiling point by the element 2 than would be possible if the incoming water was completely cold (i.e. at ambient temperature). In this manner the draw-off capacity of the unit is increased. In the preferred form of the invention the water heating tank has a capacity of approximately 2½ liters or 15 cups.

In use the unit is connected to a water supply via inlet pipe 7. Water then enters the level control tank and passes through the control flow pipe into the water heating tank until the level control tank and the water heating tank are both full to the maximum water level. At this point the float 4 is lifted so that the float rod 5 pivots and shuts the water inlet valve 6. Once the water heating tank has been filled to the level of outlet 23, power may be supplied through connection 16 to heat the water in the water heating tank until it reaches boiling point. Once the thermostat bulb 19 senses steam at 100° C., the thermostat 17 shuts off the power supply to the element 2. When the steam temperature falls to 99.5° C., the thermostat 17 is again activated to resupply power to the heating element. In this manner the water in the water heating tank is maintained at or about boiling point. When it is desired to use boiling water, it is drawn-off through outlet 23 lowering the water level in the water heating tank, and causing preheated water from the level control tank 3 to flow through the pipe 9 and the flow rate limiting orifice 12 into the lower part of the heating tank. As the preheated water enters the water heating tank, the temperature of the water in the tank is lowered causing the steam temperature to drop to 99.5° C. and the heating element to be activated by the thermostat. As the flow rate of preheated water into the water heating tank is regulated by the orifice 12 and is directed onto the element 2, the preheated water is immediately heated to boiling point to maintain only boiling water in the water heating tank 1. In this manner any water drawn off through the outlet 23 will always be at or about boiling point.

In this manner a boiling water heating unit is provided which, in a compact layout, enables water to be constantly supplied at a rate which is adequate to meet most normal domestic and small office situations.

What we claim is:

1. A continuous water heating unit comprising: a water heating tank containing an electric heating element near the bottom of said tank; a level control tank mounted alongside said heating tank, said level control tank incorporating a float actuable valve connected to a supply of water and arranged to maintain water in said level control tank within predetermined maximum and minimum level limits; a draw-off connection from said heating tank; a controlled flow connection between said level control tank and said water heating tank arranged to allow water to pass from said level control tank to said water heating tank at a controlled rate substantially equal to the boiling water heating rate of said element; a conduit communicating between said water heating tank and said level control tank above the maximum water level in said tanks; and a temperature control device including a temperature sensitive probe which is at least partially mounted in said conduit and is substantially surrounded by a gauze tube so as to direct steam from said water heating tank over said probe; said temperature control device being responsive to the temperature of water in said tank for supplying electricity to said heating element when the temperature of the water in said water heating tank is below boiling point and to cut the supply of electricity to said element when the temperature of the water in said water heating tank reaches boiling point.

2. A continuous water heating unit as claimed in claim 1, wherein said gauze is metal.

3. A continuous water heating unit as claimed in claim 1 or 2, wherein said float actuable valve comprises a mechanical valve actuable by a float on the end of a pivoting float arm within said level control tank.

4. A continuous water heating unit comprising: a water heating tank containing an electric heating element near the bottom of said tank; a level control tank mounted alongside said heating tank, said level control tank incorporating a float actuable valve connected to a supply of water and arranged to maintain water in said level control tank within predetermined maximum and minimum level limits; a draw-off connection from said heating tank; a controlled flow connection between said level control tank and said water heating tank arranged to allow water to pass from said level control tank to said water heating tank at a controlled rate substantially equal to the boiling water heating rate of said element;

a temperature control device responsive to the temperature of the water in said heating tank for supplying electricity to said heating element when the temperature of the water in said water heating tank is below boiling point and to cut the supply of electricity to said element when the temperature of the water in said water heating tank reaches boiling point; a safety device incorporating a safety valve and a temperature sensitive capillary, said safety device being located in the upper part of one of said tanks and being actuable by abnormal steam pressure within the upper part of said water heating tank and said level control tank to open said safety valve and allow steam to pass onto said temperature sensitive capillary; and a cut-off switch arranged to be activated by the capillary to cut the supply of electricity to said element.

5. A continuous water heating unit as claimed in claim 4, wherein said draw-off connection is located above the level of said heating element, and a safety vent tube is provided having one end located in said water heating tank below the level of said draw-off connection and above said water heating element, and the other end located to direct steam passing therefrom onto said temperature sensitive capillary.

6. A continuous water heating unit as claimed in claim 4 or 5, wherein said temperature control device includes a temperature sensitive probe mounted above the maximum water level of the water heating tank, said probe being encased in a tube of gauze disposed so as to direct steam from said heating tank over said probe, and said gauze being located in and protruding from a conduit communicating between said heating tank and said level control tank above the maximum water level in said tanks.

7. A continuous water heating unit as claimed in claim 6, wherein said gauze is metal.

* * * * *